(12) United States Patent
Endres et al.

(10) Patent No.: US 10,113,886 B2
(45) Date of Patent: Oct. 30, 2018

(54) METHOD FOR MONITORING A TRANSMISSION LINK

(71) Applicants: Continental Teves AG & Co. oHG, Frankfurt (DE); NXP B.V., Eindhoven (NL)

(72) Inventors: Ralf Endres, Groß-Gerau (DE); Jochen Zachow, Glashütten (DE); Andreas Kannengiesser, Buchholz (DE); Jörg Kock, Horst (DE); Robert Meyer, Hamburg (DE)

(73) Assignees: Continental Teves AG & Co. oHG, Frankfurt (DE); NXP B.V., Eindhoven (NL)

( * ) Notice: Subject to any disclaimer, the term of this patent is extended or adjusted under 35 U.S.C. 154(b) by 241 days.

(21) Appl. No.: 15/023,004

(22) PCT Filed: Sep. 5, 2014

(86) PCT No.: PCT/EP2014/068981
§ 371 (c)(1),
(2) Date: Mar. 18, 2016

(87) PCT Pub. No.: WO2015/039895
PCT Pub. Date: Mar. 26, 2015

(65) Prior Publication Data
US 2016/0231141 A1    Aug. 11, 2016

(30) Foreign Application Priority Data
Sep. 20, 2013 (DE) .................. 10 2013 015 575

(51) Int. Cl.
G06F 11/00 (2006.01)
G01D 5/244 (2006.01)
(Continued)

(52) U.S. Cl.
CPC .......... *G01D 5/24466* (2013.01); *B60T 8/885* (2013.01); *G01P 3/487* (2013.01);
(Continued)

(58) Field of Classification Search
CPC ...... G01D 5/24466; B60T 8/885; G01P 3/487
See application file for complete search history.

(56) References Cited

U.S. PATENT DOCUMENTS 4,656,588 A * 4/1987 Kubo .................. B60T 8/17616
303/122.11
5,799,748 A * 9/1998 Origuchi ................ B60K 23/08
180/233
(Continued)

FOREIGN PATENT DOCUMENTS

CN 1445513 A 10/2003
CN 1477369 A 2/2004
(Continued)

OTHER PUBLICATIONS

German Search Report for German Application No. 10 2013 015 575.4 dated Mar. 24, 2014, including partial translation.
(Continued)

*Primary Examiner* — Esaw T Abraham
(74) *Attorney, Agent, or Firm* — RatnerPrestia

(57) ABSTRACT

A method for transmitting a measured value in a data transmission signal, the method including: introduction of the measured value into the data transmission signal; introduction of error information after said measured value into the data transmission signal, from which information it can be deduced whether the measured value contains an error; and introduction of evaluation information which describes the error information into the data transmission signal after the error information, if the measured value contains an error.

13 Claims, 3 Drawing Sheets

(51) Int. Cl.
- *B60T 8/88* (2006.01)
- *G01P 3/489* (2006.01)
- *G01P 21/02* (2006.01)
- *G01P 3/487* (2006.01)

(52) U.S. Cl.
CPC .............. *G01P 3/489* (2013.01); *G01P 21/02* (2013.01); *B60T 2270/416* (2013.01)

(56) References Cited

U.S. PATENT DOCUMENTS

| | | | | |
|---|---|---|---|---|
| 5,922,038 | A * | 7/1999 | Horiuchi | B60T 8/885 303/122.05 |
| 6,456,908 | B1 * | 9/2002 | Kumar | B60L 3/0023 318/490 |
| 7,130,754 | B2 | 10/2006 | Satoh et al. | |
| 7,165,209 | B2 * | 1/2007 | LaBerge | H04L 1/0009 714/790 |
| 8,229,663 | B2 | 7/2012 | Zeng et al. | |
| 8,467,929 | B2 * | 6/2013 | Bechtler | B60T 8/885 701/29.1 |
| 9,014,921 | B2 | 4/2015 | Bretzigheimer | |
| 9,086,141 | B2 * | 7/2015 | Neelakantan | F16H 61/0437 |
| 9,193,340 | B2 * | 11/2015 | Kim | B60T 8/32 |
| 2009/0012735 | A1 | 1/2009 | Reichmann | |
| 2010/0090809 | A1 | 4/2010 | Yeo | |

FOREIGN PATENT DOCUMENTS

| | | |
|---|---|---|
| CN | 101799992 A | 8/2010 |
| DE | 10146949 | 6/2002 |
| DE | 102007048813 | 10/2008 |
| DE | 102007029321 | 12/2008 |
| DE | 102011080789 | 2/2012 |
| DE | 102010064205 | 6/2012 |
| WO | 2005038489 | 4/2005 |

OTHER PUBLICATIONS

International Search Report for International Application No. PCT/EP2014/068981 dated Mar. 4, 2015.
Written Opinion of the International Searching Authority for International Application No. PCT/EP2014/068981 dated Mar. 4, 2015.
Siemens AG; Ultraschall-Durchflußmeßgerät SITRANS F mit PROFIBUS-PA-Schnittstelle Betriebsanleitung (Ergänzung); Karlsruhe; Firmenintern; 1999; DE.
Chinese Office Action for Chinese Application No. 201480063005.7, dated Jan. 29, 2018, including English translation, 12 pages.

* cited by examiner

METHOD FOR MONITORING A TRANSMISSION LINK

CROSS REFERENCE TO RELATED APPLICATIONS

This application is the U.S. National Phase Application of PCT International Application No. PCT/EP2014/068981, filed Sep. 5, 2014, which claims priority to German Patent Application No. 10 2013 015 575.4, filed Sep. 20, 2013, the contents of such applications being incorporated by reference herein.

FIELD OF THE INVENTION

The invention relates to a method for monitoring a transmission link between a sensor and an evaluation unit, a control device for carrying out the method, and to a sensor comprising the control device.

BACKGROUND OF THE INVENTION

A vehicle in which wheel speed sensors for detecting the wheel speed of the individual wheels are installed is known from DE 10 2011 080 789 A1, which is incorporated by reference. These wheel speed sensors are active wheel speed sensors and transmit their measured data in the form of wheel speeds via a cable, as the transmission link, to an evaluation unit.

SUMMARY OF THE INVENTION

The problem addressed by an aspect of the invention is that of improving the transmission of the measured data.

According to one aspect of the invention, a method for transmitting a measured value in a data transmission signal comprises the steps of introducing the measured value into the data transmission signal; introducing error information, after the measured value, into the data transmission signal, from which information it can be deduced whether the measured value contains an error; and, if the measured value contains the error, introducing evaluation information, which describes the error information, into the data transmission signal after the error information.

The stated method addresses the problem that erroneous measured values must be detected and suitably taken into account in processing in order to comply with high safety standards. The detection of erroneous measured values could be carried out in the unit that processes the measured values. The problem arises here, however, that the detection is based on algorithms, which are computationally intensive in part, and which require a certain amount of time to run.

For this reason, it would be desirable to incorporate the sensor that detects the measured values into the detection of the erroneous measured values. To this end, however, the sensor itself would have to transmit the information regarding the error in a measured value in addition to the erroneous measured value, so that this information can be taken into account in the processing. The more information the sensor provides regarding the error, the more quickly this can be reacted to during the processing, which can substantially increase safety in applications in a vehicle, in particular.

In many sensors, the intention to transmit an indication of the error and as much information as possible regarding the error conflicts with the basic technical conditions that measured values are transmitted at periodic intervals and, therefore, relatively little bandwith is available for transmitting the information. The situation intensifies when these periodic intervals between the measured values change depending on the situation and, only in certain situations, the bandwidth is no longer sufficient for transmitting the indication of the error and the information regarding the error.

The stated method therefore proposes that the measured value, the indication of the error, and the information regarding the error should be transmitted, within the scope of the method, in a temporally ascending sequence for further processing. If the bandwidth should decrease and if there is no longer enough time between two measured values to transmit all information, the information regarding the error is cut off first. Although this no longer permits the error to be qualified, the information that an error is present is still available, which can be reacted to appropriately. In this manner, errors in the transmitted measurement data can be detected better and more reliably in the processing, even if all the information regarding the error cannot be transmitted due to reasons related to space and time.

In one refinement of the stated method, the measured value is introduced into the data transmission signal as a pulse from an active speed sensor. In active speed sensors, wheel speed information is output as pulses, as is known, and the speed can be deduced from the number of said pulses over a certain period of time. The fundamental problem in this case, however, is that, at relatively high speeds, the number of pulses continuously increases over a certain time period, and so the interval between two pulses for transmitting the aforementioned information regarding whether an error is present and what this error looks like is too small precisely in those speed ranges in which high robustness with respect to errors is necessary. A vehicle dynamics controller for a vehicle, which must react reliably, in particular, in high speed ranges of the wheels, is mentioned here as an example. In this case, the method can improve the error handling in a particularly favorable manner, because when errors that cannot be qualified are detected in high speed ranges within the scope of the stated method, the speed could be returned to a range, for example, in which the error can be qualified again. Within the scope of the vehicle dynamics controller, the vehicle could be braked to a certain speed, for example.

In another refinement of the stated method, the evaluation information includes an error-qualification range and an error-quantification range. The type of error involved could be indicated in the error-qualification range, whereas, for example, information regarding the cause of the error could be transmitted in the error-quantification range, so that the error can be better evaluated in the processing and, therefore, taken into account or discarded accordingly.

In a particular refinement of the stated method, the error-qualification range is disposed before the error-quantification range, and so, in the event of the aforementioned reduction of the bandwidth for transmitting the information regarding the error, it is always initially clear as to which error is involved, before background information regarding this error is also transmitted.

In a preferred refinement of the stated method, the error-qualification range comprises at least two information segments, of which a first one of the information segments qualifies a first error type and the second one of the information segments qualifies a second error type. In this manner, upon receipt of the transmitted information, it would be possible to simply query the individual information segments and work one's way along toward the recognition of the error, in the manner of a process of elimination. If one of the information segments exhibits a certain error type, then this error type is present. An information segment can be understood to be an individual information unit, such as a bit or a symbol, or also a group of multiple information units, such as, for example, a byte.

In a particularly preferred refinement of the mentioned method, a sequence of the two information segments is dependent upon an error effect of the two error types. In this manner, in the error-qualification range, the errors can initially transmit information segments that qualify the errors having a high error effect. If the space for transmitting all information segments would be insufficient for transmitting all information segments, at least those information segments which indicate an error having a high error effect would be transmitted.

In yet another refinement of the stated method, the error-quantification range includes information regarding a cause of the error, and so state information, for example, can also be taken into account in the evaluation of the error, which state information indicates, for example, a pending error having a high error effect, such as a failure of the sensor. Warning messages, such as a recommendation to bring the aforementioned vehicle in for maintenance, could similarly be output.

In an additional refinement of the stated method, if the measured value does not contain an error, additional information, which describes a sensor detecting the measured value, is introduced into the data transmission signal after the error information. In this manner, state information regarding the sensor could also be collected and evaluated in the evaluation of the measured values during normal operation.

According to a further aspect of the invention, a control device is designed to carry out one of the stated methods.

In one refinement of the stated control device, the stated device comprises a memory and a processor. In this case, one of the stated methods is stored in the form of a computer program in the computer and the processor is provided for carrying out the method if the computer program is loaded from the memory and into the processor.

According to a further aspect of the invention, a computer program comprises program code means for carrying out all steps of one of the stated methods if the computer program is run on a computer or one of the stated devices.

According to a further aspect of the invention, a computer program product contains a program code, which is stored on a computer-readable data carrier, and which runs one of the stated methods when said program code is executed on a data processing device.

According to a further aspect of the invention, a sensor comprises one of the stated control devices.

In a particular refinement, the stated sensor is a wheel speed sensor.

According to a further aspect of the invention, a vehicle comprises one of the stated wheel speed sensors.

BRIEF DESCRIPTION OF THE DRAWINGS

The above-described properties, features, and advantages of this invention and the manner in which they are achieved will become clearer and easier to understand in combination with the following description of the exemplary embodiments, which are described in greater detail in combination with the drawings, wherein.

DETAILED DESCRIPTION OF THE PREFERRED EMBODIMENTS

In the figures, identical technical elements are provided with the same reference numbers and are described only once.

Figure 1:
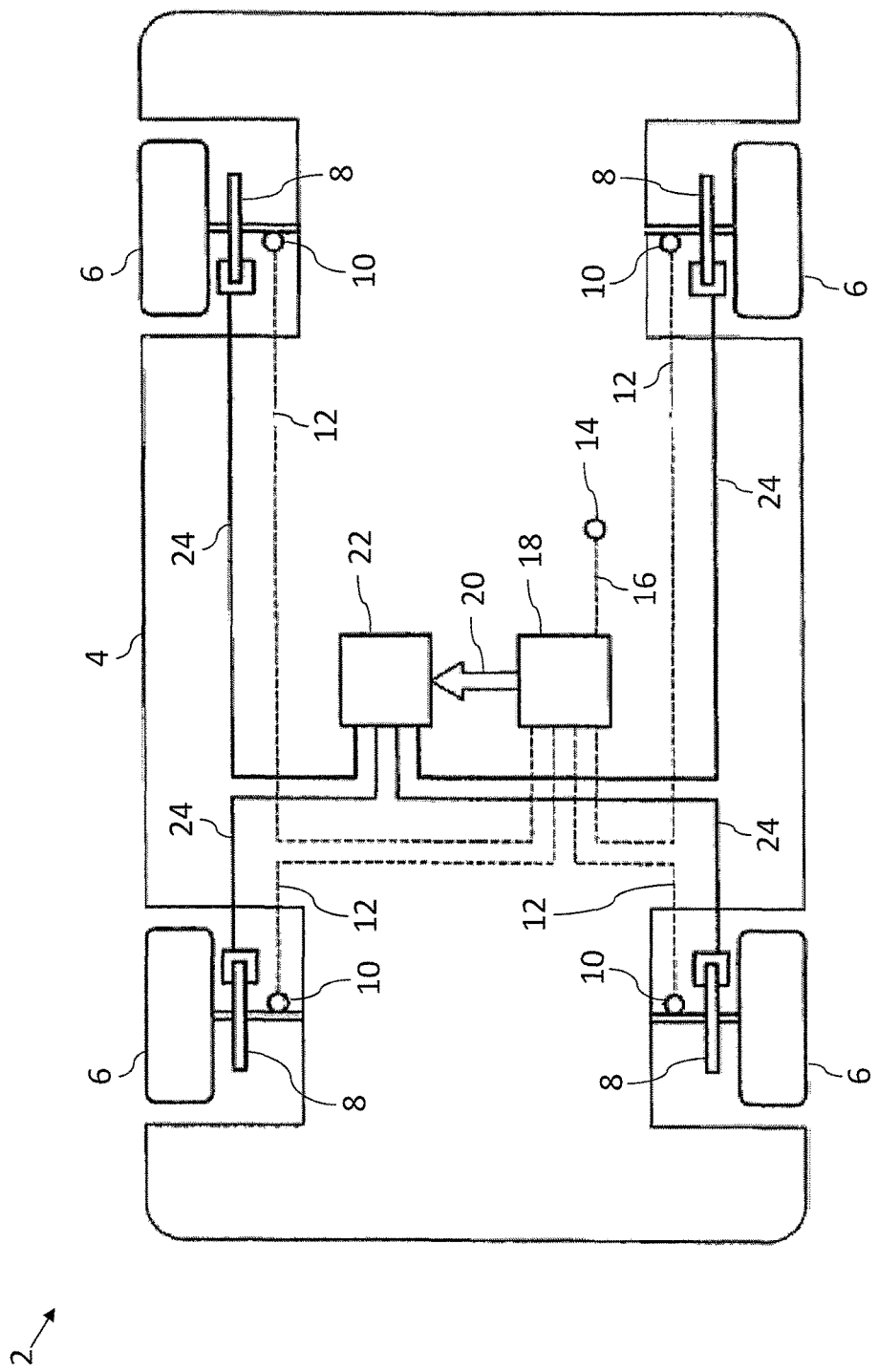
FIG. 1 shows a schematic view of a vehicle comprising a vehicle dynamics controller.

Reference is made to FIG. 1, which shows a schematic view of a vehicle 2 having a vehicle dynamics controller, which is known per se. The details of this vehicle dynamics controller can be found, for example, in DE 10 2011 080 789 A1, which is incorporated by reference. The vehicle 2 comprises a chassis 4 and four wheels 6. Each wheel 6 can be decelerated with respect to the chassis 4 with the aid of a brake 8 fixedly fastened on the chassis 4, in order to decelerate a movement of the vehicle 2 on a non-illustrated road.

In this case, it is possible, in a manner known to a person skilled in the art, for the wheels 6 of the vehicle 2 to lose their road contact and for the vehicle 2 to even move away from a trajectory, which is specified, for example, via a non-illustrated steering wheel, due to understeering or oversteering. This is avoided by control loops known per se, such as ABS (antilock braking system) and ESP (electronic stability program).

In the present embodiment, the vehicle 2 comprises speed sensors 10 on the wheels 6 for this purpose, which speed sensors detect a speed 12 of the wheels 6. The vehicle 2 further comprises an inertial sensor 14, which detects vehicle dynamics data 16 of the vehicle 2, which data can include, for example, a pitch rate, a roll rate, a yaw rate, a lateral acceleration and/or a vertical acceleration, which are output in a manner known per se to a person skilled in the art.

Based on the detected speeds 12 and vehicle dynamics data 16, an evaluation unit in the form of a regulator 18 can determine, in a manner known to a person skilled in the art, whether the vehicle 2 is sliding on the roadway or is even deviating from the aforementioned, specified trajectory, and can react thereto accordingly via a regulator output signal 20, which is known per se. The regulator output signal 20 can then be used by a servomechanism 22 in order to activate, by means of actuating signals 24, actuators such as the brakes 8, which react to the sliding and the deviation from the specified trajectory in a manner known per se.

The present invention will now be described in greater detail on the basis of one of the speed sensors 10 shown in FIG. 1, even though the present invention can be implemented on any type of sensors, such as, for example, the inertial sensor 14.

Figure 2:
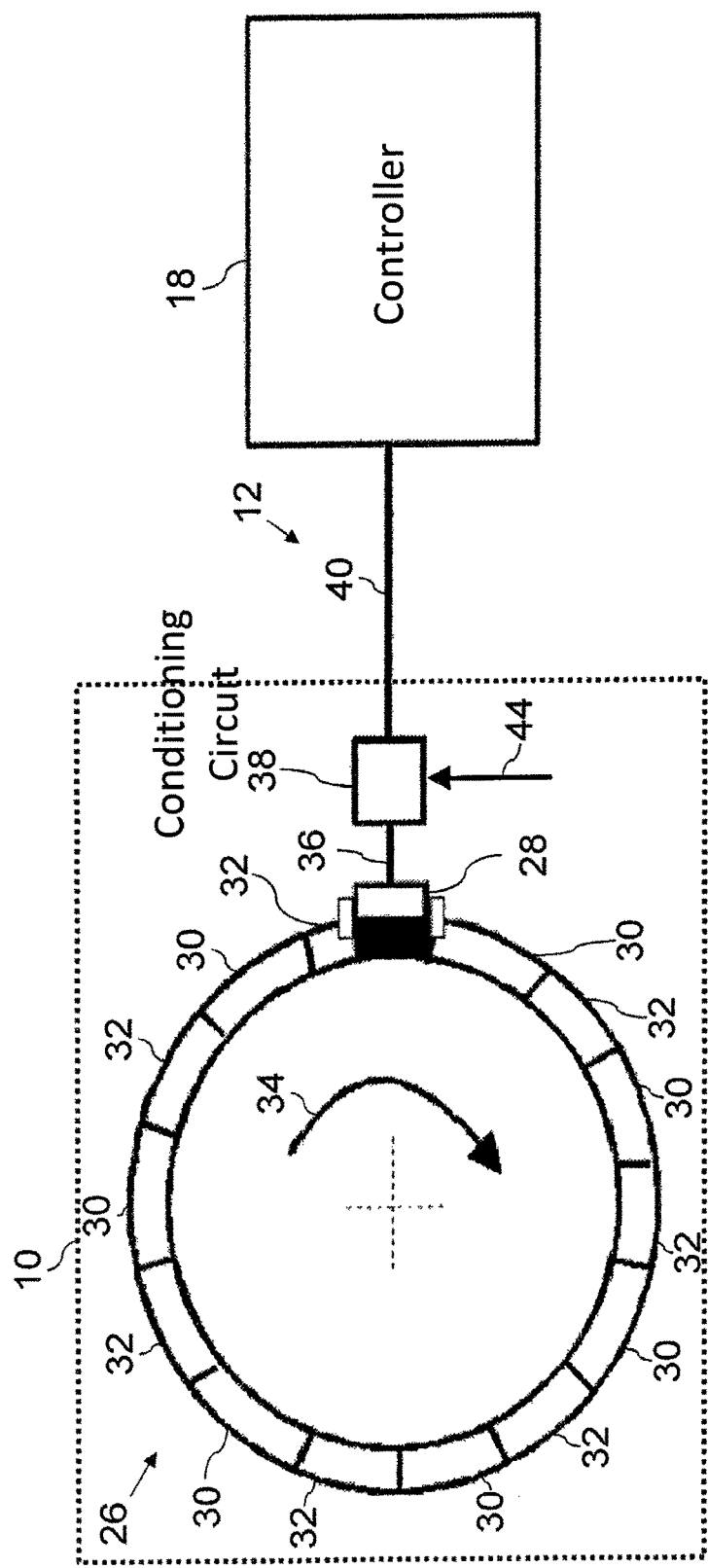
FIG. 2 shows a schematic view of a wheel speed sensor in the vehicle from FIG. 1.

Reference is made to FIG. 2, which shows a schematic view of one of the speed sensors 10 in the vehicle dynamics controller from FIG. 1.

In the present embodiment, the speed sensor 10 is designed as an active speed sensor, which comprises an encoder disk 26, which is fastened on the wheel 6 for rotation therewith, and a reading head 28 fixedly fastened on the chassis 4.

In the present embodiment, the encoder disk 26 consists of magnetic north poles 30 and magnetic south poles 32, which are arranged in a row and jointly excite a non-illustrated sensor magnetic field. If the encoder disk 26, which is fastened on the wheel 6, rotates along with said wheel in a direction of rotation 34, the sensor magnetic field therefore also rotates therewith.

In the present embodiment, the reading head 28 is a magnetostrictive element, which changes its electrical resistance as a function of the angular position of the sensor magnetic field excited by the encoder wheel 26.

Figure 3:
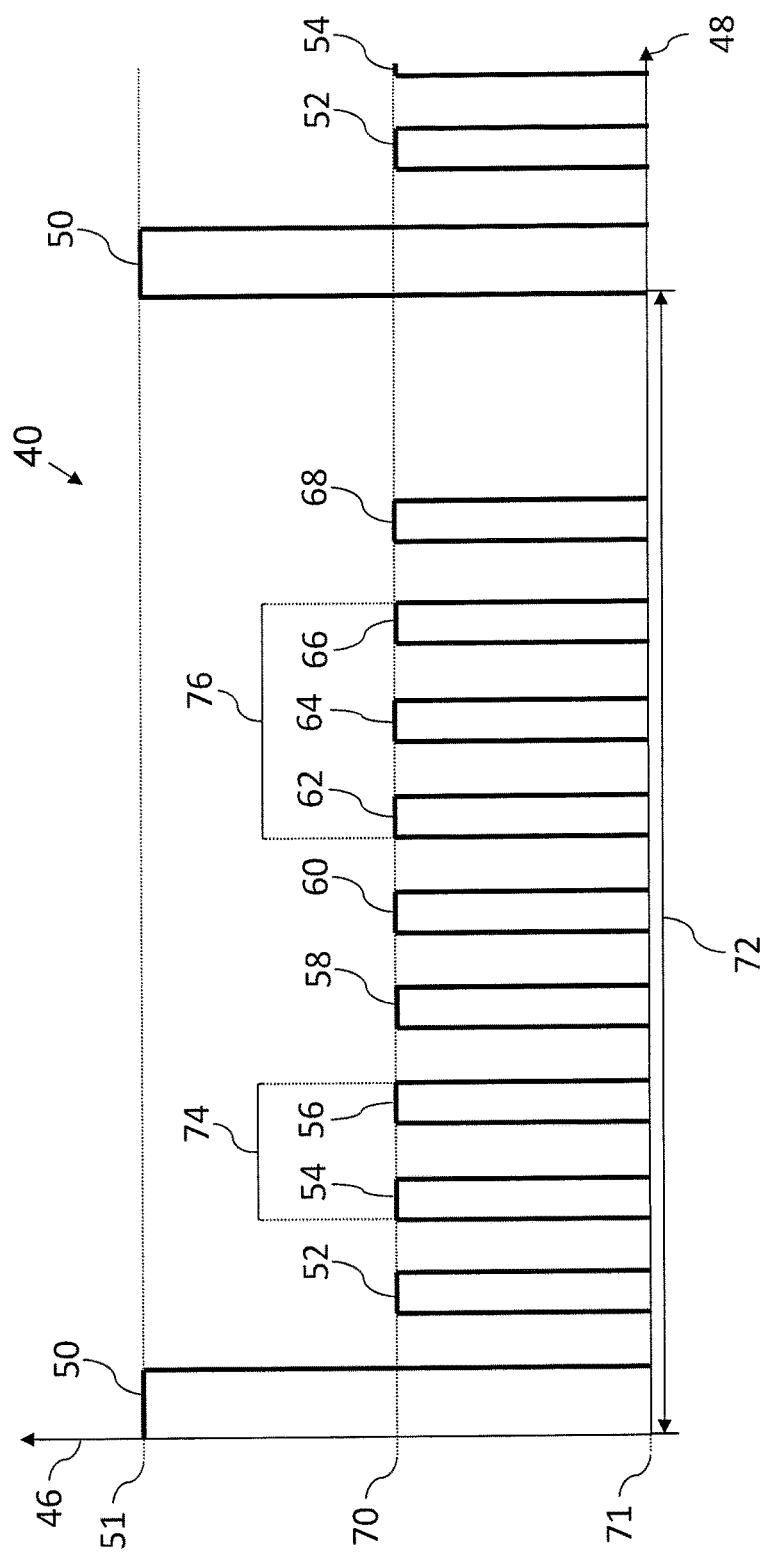
FIG. 3 shows a diagram having an output signal from the wheel speed sensor from FIG. 2.

In order to detect the speed 12, the change in the angular position of the encoder wheel 26 and, therefore, the change in the electrical resistance of the reading head 28, is detected. For this purpose, the reading head 28 can be connected, in a manner known per se, to a non-illustrated resistance measuring circuit, such as, for example, to a bridge circuit known per se. A periodic output signal, which is referred to in the following as a speed sensor signal 36, is generated in the resistance measuring circuit as a function of the electrical resistance of the reading head 28. On the basis of the speed sensor signal 36, a pulse signal 40, which is dependent on the speed 12 and is shown in FIG. 3, can be generated and output to the regulator 18 in a manner known per se in a signal conditioning circuit 38 disposed downstream from the reading head 28. Reference is made to the relevant prior art, such as, for example, DE 101 46 949 A1, which is incorporated by reference, in this context and with respect to further background information on active wheel speed sensors.

In the present embodiment, in addition to the information regarding the speed 12, error information 42 shown in FIG. 3 is also introduced into the pulse signal 40 as a data transmission signal, from which information it can be deduced whether a certain measured value for the speed 12 contains an error, or not. This error information 42 can be derived, for example, in the signal conditioning circuit 38, from a state signal 44 and can be modulated into the pulse signal 40. The state signal 44 can be output, for example, from a non-illustrated monitoring circuit, which monitors the error state of the speed sensor 10. Reference is made to FIG. 3, in which the pulse signal 40 is illustrated in the form of current values 46 with respect to time 48.

The pulse signal 40 carries the information regarding the speed 12, as a speed pulse 50 having a first pulse level 51, which is referred to in the following as a high pulse level 51. These speed pulses 50 are transmitted with highest priority, which means that the transmission of all other information is postponed or aborted in the event of a pending transmission of a speed pulse 50.

In addition to the speed pulses 50, at least one further information pulse 52 to 68 is introduced into the pulse signal 40, which information pulse can include, for example, a second pulse level 70, which is referred to in the following as the medium pulse level 70, or a third pulse level 71, which is referred to in the following as the low pulse level 71, depending on the information to be transmitted. In FIG. 3, all information pulses 52 to 68 are shown with the medium pulse level 70, for clarity. The information pulse 52 to 68 can carry error information, from which information it can be deduced whether the speed pulse 50 disposed upstream from the information pulse 52 to 68 has an error, or not. In the present embodiment, nine information pulses 52 to 68 are introduced into the pulse signal 40 after the speed pulse 50, which information pulses carry the aforementioned error information and further information based on the AK protocol of the working group of the German automotive industry, which protocol is known per se. In this case, each information pulse 52 to 68 carries a bit #0 to #8. If an information pulse 52 to 68 is transmitted with the medium pulse level 70, its corresponding bit #0 to #8 is set to 1. If an information pulse 52 to 68 is transmitted with the low pulse level 71, its corresponding bit #0 to #8 is set to 0. The AK protocol was traditionally used for monitoring an air gap, which is not visible in FIG. 2, between the encoder wheel 26 and the reading head 28, wherein the individual information pulses 52 to 68, in the following, were assigned in the following manner:

| Bit | Pulse | Abbreviation | Description | Coding |
|---|---|---|---|---|
| #0 | 52 | LR | Air gap reserve | '0' = OK |
|  |  |  |  | '1' = bad |
| #1 | 54 |  |  |  |
| #2 | 56 |  |  |  |
| #3 | 58 | GDR | Validity of the direction-of-rotation information | '0' = invalid |
|  |  |  |  | '1' = valid |
| #4 | 60 | DR | Direction of rotation | '0' = positive |
|  |  |  |  | '1' = negative |
| #5 | 62 |  |  |  |
| #6 | 64 |  |  |  |
| #7 | 66 |  |  |  |
| #8 | 68 | P | Parity |  |

In the vehicle, the wheel speeds 12 of all wheel speed sensors 10 of the vehicle 2 converge in the signal chain of a wheel speed sensor system in a control unit, which is assumed to be the regulator 18, by way of example, in the following, and can be conditioned and made available not only for the control unit 18 but also for a plurality of further vehicle systems. Since the wheel speeds 12 are safety-relevant due to the further use in safety systems such as, for example, in the electronic stability program (ESP) shown or in a non-illustrated antilock braking system (ABS), erroneous speed information resulting from a malfunction of the wheel speed sensor 10 must be detected by the control unit, such as the control unit 18, with a sufficiently high level of probability and within a sufficient time 48.

The aforementioned AK protocol has the disadvantage, however, that errors occurring in the wheel speed sensor 10 are not reported to the control unit 18, and so the control unit 18 would have to evaluate a potential erroneous nature and, therefore, the validity of the wheel speed 12 by means of suitable validations. In the event of an abnormal driving state, the control unit 18 should intervene into the vehicle 2 by means of the brakes 8 and restore a normal vehicle state. The difficulty for the control unit 18 is to now distinguish an invalid wheel speed 12, which would also be interpreted as an abnormal driving state, from a valid wheel speed 12 indicating the abnormal driving state. For example, the display of a wheel speed 12 that is too low can be caused by an internal error in the wheel speed sensor 12 or by the real blocking of a wheel 6, wherein the control unit 18 should only react to the real blocking of the wheel 6 by releasing the brake 8.

Values for the probability of an error for different safety levels are defined in ISO 26262. These safety levels are referred to in the following as ASIL grades and depend, for example, on an effect of a fault that the fault would have on the vehicle. The problem with using the aforementioned AK protocol is insufficient fault detection at a system level of the vehicle 2 for achieving specified ASIL grades.

Therefore, within the scope of the present embodiment, error information ascertained by a self-diagnosing functionality of the wheel speed sensor 10 is transmitted to the control unit 18 via the AK protocol. The self-diagnosing functionality can be provided, for example, by the aforementioned state signal 44, which is provided by the monitoring device, while the error information can be transmitted in at least one of the information pulses 52 to 68. In this manner, the probability that the control unit 18 detects an error is increased, because an unambiguous differentiation between an error at the level of the wheel speed sensor 10 and an abnormal driving state is possible. In this manner, specified ASIL grades can be achieved by the entire system, i.e., by the vehicle dynamics controller in the present case.

For the implementation of the transmission of the error information via the AK protocol, the "air gap reserve" is no longer transmitted in bit #0 and, therefore, in the first information pulse 52, but rather, error information is transmitted in a general form, from which information it can be deduced whether the speed pulse 50 has an error, or not. If the internal sensor monitoring does not detect an error or anything unusual, the bit #0="0" and, therefore, the first information pulse 52 is set to the low pulse level 71 and the AK protocol is transmitted according to the table presented above. In this case, the bits #5, #6 and #7 and, therefore, the sixth, seventh, and eighth information pulse 62, 64 and 66 could represent the value of the air gap reserve. In the event of an error of the sensor element, however, the bit #1="1" and, therefore, the first information pulse 52 is set to the medium pulse level 70. The bit sequence of bits #1, #2, #5, #6 and #7, i.e., of the second, third, sixth, seventh, and eighth information pulse 54, 56, 62, 64, 66, which are unassigned in the table presented above and are therefore freely definable, are then used for a unique breakdown of general error information into $2^5=32$ causes of an error.

At high speeds of the vehicle 2, however, all 9 bits and, therefore, information pulses 52 to 68, are no longer transmitted, since a time interval 72 between two speed pulses 50 becomes so small that a new speed pulse 50 having higher priority must be output already before a complete transmission of all information pulses 52 to 68 of a data packet of the AK protocol. For example, it is no longer possible to transmit bit #8, i.e., the last information pulse 68 carrying the parity P and, therefore, a complete 5-bit error coding for speeds of >150 km/h for the vehicle 2 is no longer possible.

In order to account for these speed-dependent transmission possibilities, it is proposed within the scope of the present embodiment to transmit the errors that are possible, in principle, at the wheel speed sensor 10, depending on their error effect as determined by the ASIL grade.

An ASIL-relevant top error is an error whose transmission to the control unit 18 must be guaranteed, as opposed to ASIL-relevant errors for every speed of the vehicle 2. In order to ensure reliable detection, in particular, of ASIL-relevant top errors by the control unit 18 even at high speeds of the vehicle 2, the errors are coded in such a way that it can be detected whether the error is an ASIL-relevant top error or not, on the basis of bit #1 and, therefore, the second information pulse 54. A bit #1 set to "1" and, therefore, a second information pulse 54 having a medium pulse level 70, is generally interpreted as an ASIL-relevant top error.

On the basis of bit #2 and, therefore, the third information pulse 56, the ASIL-relevant top error can continue to be classified into two independent ASIL-relevant top errors, namely top error #1 and top error #2. Examples of one possible classification of ASIL-relevant top errors could be defined as top error #1 "The output frequency of the speed signal is higher than the x-fold of the real value" and as top error #2 "The output frequency of the speed signal is lower than the y-fold of the real value". The top error #1 could then be assigned to the third information pulse 56 and to a low pulse level 71, whereas the top error #2 could then be assigned to the third information pulse 56 having a medium pulse level 70.

An error that occurs can therefore be qualified, i.e., identified, on the basis of bits #1 and #2 and, therefore, the second and the third information pulse 54 and 56. The second and the third information pulse 54 and 56 are therefore also referred to in the following as the error-qualification range 74.

In contrast, a more precise description of the cause of the error for the two top errors #1 and #2 using bits #5, #6 and #7 and, therefore, the sixth, seventh, and eighth information pulse 62, 64 and 66, could be described, in order to quantify the error that occurred in terms of size, point in time, source of the error, cause of the error, etcetera. The sixth, seventh, and eighth information pulse 62, 64 and 66 are therefore also referred to as the error-quantification range 76.

In the present exemplary embodiment, when bit #1="0" and, therefore, the second information pulse 54 is set to the low pulse level 71, which means there is no ASIL-relevant top error, a differentiation can be made, on the basis of bit #2 and, therefore, the third information pulse 56, into a non-ASIL-relevant TOP error or a warning by correspondingly setting bit #2 to 0 or 1. In this case, the third information pulse 56 is correspondingly set either to a low pulse level 71 or a medium pulse level 70, respectively. In this case, a non-ASIL-relevant TOP error can continue to be an ASIL-relevant error or a non-ASIL-relevant error. This differentiation provides for a situation-specific handling instruction of the control unit 18 for speeds <300 km/h of the vehicle 2. Bits #5, #6 and #7, and, therefore, the sixth, seventh, and eighth information pulse 62, 64 and 66, define a unique description of the error or warning picture. An example of an ASIL-relevant error that is not an ASIL-relevant TOP error, however, is the error "The information content of the bit of the validity of the direction of rotation is false", and an example of a non-ASIL-relevant error is the error "The maximum value of the air gap has been exceeded", and, for a warning, the warning "The supply voltage of the sensor is close to the shut-off threshold".

The advantage of the type of coding presented is a differentiability of ASIL-relevant top errors and ASIL-relevant or non-ASIL-relevant errors for vehicle speeds <375 km/h and a differentiability of errors and warnings or of the two ASIL-relevant top errors for vehicle speeds <300 km/h.

The entire aforementioned description of an error transmission from the wheel speed sensor 10 to the control unit 18 conforms with the current description and definition of the AK protocol.

Within the scope of the above-described error transmission, only one error in the error-qualification range 74 and the error-quantification range 76 can be transmitted between the speed sensor 10 and the regulator 18 within the time interval 72. However, if multiple errors occur simultaneously, an error to be transmitted should be selected from among these errors. The selection criterion to use in this case can be the significance of the error in that, for example, the error having the highest significance is transmitted.

If a sensor error is not detected, a transmission of the AK protocol is carried out according to the definition in the table presented above. In the event of error, bit #0="1" is set, which is also recognized and evaluated by older models of control units 18 as an abnormal operating state. A downward compatibility to older control units is therefore given. A future model of control units makes it possible for an evaluation of the error coding to achieve specified ASIL grades of the entire system.

The invention claimed is:
1. A method for transmitting error information in a data transmission signal, comprising:

introducing, by a vehicle conditioning circuit, measured value pulses into the data transmission signal, the measured value pulses indicate a measured value detected by a sensor;

introducing, by the vehicle conditioning circuit, an, error indication pulse into the data transmission signal, the error indication pulse indicates that the measured value contains an error;

introducing, by the vehicle conditioning circuit, at least one evaluation information pulse into the data transmission signal, the at least one evaluation information pulse identifies the error in the measured value; and in response to the error indication pulse indicating that the measured value contains an error, controlling, by the vehicle controller, a driver assistance system of the vehicle based on the at least one evaluation information pulse.

2. The method as claimed in claim 1, wherein the measured value is introduced into the data transmission signal as a pulse from an active speed sensor.

3. The method as claimed in claim 2, wherein the evaluation information includes an error-qualification range and an error-quantification range.

4. The method as claimed in claim 3, wherein the error-qualification range is disposed upstream from the error-quantification range.

5. The method as claimed in claim 4, wherein the error-qualification range comprises at least two information segments, of which a first one of the information segments qualifies a first error type and the second one of the information segments qualifies a second error type.

6. The method as claimed in claim 5, wherein a sequence of the two information segments is dependent upon an error effect of the two error types.

7. The method as claimed in claim 3, wherein the error-quantification range includes information regarding a cause of the error.

8. The method as claimed in claim 1, wherein, if the measured value does not contain an error, additional information, which describes a sensor detecting the measured value, is introduced into the data transmission signal after the error information.

9. A control unit, which is designed for carrying out a method for transmitting error information in a data transmission signal, the control unit comprising:
a processor configured to:
receive, from a vehicle conditioning circuit:
measured value pulses introduced into the data transmission signal, the measured value pulses indicate a measured value detected by a sensor,
error information introduced into the data transmission signal after the measured value, the error information indicates that the measured value contains an error, and
at least one evaluation information pulse introduced into the data transmission signal, the at least one evaluation information pulse identifies the error in the measured value, and
control a driver assistance system of the vehicle based on the at least one evaluation information pulse in response to the error indication pulse indicating that the measured value contains an error.

10. A sensor, which comprises the control unit according to claim 9.

11. The sensor according to claim 10, wherein the sensor is a wheel speed sensor.

12. The method as claimed in claim 1, wherein the evaluation information includes an error-qualification range and an error-quantification range.

13. The method as claimed in claim 3, wherein the error-qualification range comprises at least two information segments, of which a first one of the information segments qualifies a first error type and the second one of the information segments qualifies a second error type.

* * * * *